United States Patent
Blizzard et al.

(10) Patent No.: US 11,526,775 B2
(45) Date of Patent: Dec. 13, 2022

(54) AUTOMATICALLY EVALUATING APPLICATION ARCHITECTURE THROUGH ARCHITECTURE-AS-CODE

(71) Applicant: Capital One Services, LLC, McLean, VA (US)

(72) Inventors: Zachary Blizzard, Sterling, VA (US); Christopher Ocampo, Annandale, VA (US); Tanusree McCabe, Washington, DC (US); Bradley Dellinger, Philadelphia, PA (US); Bita Akhlaghi, McLean, VA (US); Francois Tur, Edgewater, MD (US); Diego Norri, Arlington, VA (US); Elizabeth Ashton, Arlington, VA (US); Asa Britten, McLean, VA (US); Jonathan Tran, Centreville, VA (US); Natalia Noyes, Washington, DC (US); Keith Spaar, Arlington, VA (US); Richard Dillon, Fairfax, VA (US); Abhishek Ravi, Lakeland, TN (US); Asher Gilani, Montville, NJ (US); Daniel Tran, McLean, VA (US); Claude Reyes, Sterling, VA (US); Blair Christopher, Richmond, VA (US)

(73) Assignee: CAPITAL ONE SERVICES, LLC, McLean, VA (US)

( * ) Notice: Subject to any disclaimer, the term of this patent is extended or adjusted under 35 U.S.C. 154(b) by 139 days.

(21) Appl. No.: 17/163,757

(22) Filed: Feb. 1, 2021

(65) Prior Publication Data

US 2022/0245475 A1 Aug. 4, 2022

(51) Int. Cl.
*G06N 5/02* (2006.01)
*G06F 16/33* (2019.01)
(Continued)

(52) U.S. Cl.
CPC .......... *G06N 5/027* (2013.01); *G06F 3/0482* (2013.01); *G06F 8/73* (2013.01); *G06N 5/025* (2013.01);
(Continued)

(58) Field of Classification Search
CPC ........ G06N 5/027; G06N 5/025; G06N 20/00; G06F 3/0482; G06F 8/73; G06F 8/34; G06F 8/35; G06Q 10/0635
See application file for complete search history.

(56) References Cited

U.S. PATENT DOCUMENTS

| 8,996,559 B2 | 3/2015 | Ganti et al. |
| 2009/0158246 A1* | 6/2009 | Sifter ........................ G06F 8/20 717/104 |

(Continued)

FOREIGN PATENT DOCUMENTS

EP 2783284 B1 3/2019

OTHER PUBLICATIONS

Gautam K. Bhat et al., De-convolving Migration Methodology via detailed Assessment and Cognitive Learning, 2017 IEEE, [Retrieved on Jul. 13, 2022]. Retrieved from the internet: <URL: https://ieeexplore.ieee.org/stamp/stamp.jsp?tp=&arnumber=8430730> 5 Pages (119-123) (Year: 2017).*

(Continued)

*Primary Examiner* — Anibal Rivera
(74) *Attorney, Agent, or Firm* — Troutman Pepper Hamilton Sanders LLP; Christopher J. Forstner; John A. Morrissett (57) ABSTRACT

The disclosed technology includes systems and methods for automatically generating a dynamic system context diagram based on machine-readable code. A method can include receiving, at a rules engine, machine-readable code describing interactions among a plurality of applications in software (Continued)

architecture, evaluating, with the rules engine in communication with a system of record (SoR), compliance of the interactions among the plurality of applications according to the SoR, identifying, with the rules engine, and based on compliance evaluation, one or more dependencies among the plurality of applications, generating, with an output engine, a system context diagram image comprising a graphical representation of the plurality of applications with associated interactions and dependencies, and outputting, for display, the system context diagram image.

20 Claims, 8 Drawing Sheets

(51) Int. Cl.
    *G06F 8/73*     (2018.01)
    *G06Q 10/06*     (2012.01)
    *G06F 3/0482*     (2013.01)
    *G06N 20/00*     (2019.01)
    *G06F 21/57*     (2013.01)
    *G06F 8/34*     (2018.01)
    *G06F 8/35*     (2018.01)

(52) U.S. Cl.
    CPC ......... *G06N 20/00* (2019.01); *G06Q 10/0635* (2013.01); *G06F 8/34* (2013.01); *G06F 8/35* (2013.01); *G06F 21/577* (2013.01); *G06F 2221/033* (2013.01)

(56) References Cited

U.S. PATENT DOCUMENTS

2015/0370848 A1   12/2015   Yach et al.
2020/0067861 A1*   2/2020   Leddy ................. G06F 21/6245
2021/0073285 A1*   3/2021   Hunter ..................... G06N 3/08

OTHER PUBLICATIONS

Jan-Jelle Kester, CheckMerge: A System for Risk Assessment of Code Merges, Apr. 26, 2018, [Retrieved on Jul. 13, 2022]. Retrieved from the internet: <URL: http://essay.utwente.nl/74905/1/Kester_MA_EEMCS.pdf> 75 Pages (1-75) (Year: 2018).*

"PCI Quick Reference Guide, Understanding the Payment Card Industry, Data Security Standard version 1.2," PCI Security Standards Council (2008).

* cited by examiner

AUTOMATICALLY EVALUATING APPLICATION ARCHITECTURE THROUGH ARCHITECTURE-AS-CODE

FIELD

The disclosed subject matter relates generally to generating application architecture and associated system context diagrams through machine-readable code, and in particular, to real-time evaluation of the architecture for compliance to standards and identification of resiliency risks.

BACKGROUND

System context diagrams are informative visual tools that are used in industry to explain how various components and applications interact with each other in a system. Many software tools exist in the market for generating static system diagrams, including Lucidchart™, Microsoft Visio™, Draw.io, Creately™, Pidoco™, etc. While these tools can provide schematic diagrams and/or block diagrams to help system engineers describe and understand the initial system, the resulting visual presentation can be become stale (no longer accurately informed) as the system evolves, and/or as new system dependencies are added or changed.

Certain applications can be represented via a system context diagram and may depend on other "downstream" components to complete associated tasks before the main process completes. Furthermore, some applications may have a resiliency tier designation that specifies a maximum tolerable downtime. Resiliency tiers can change with time and can be affected by various downstream dependencies. The real-time interplay between the various applications and components can quickly outdate a static system context diagram, particularly when there are multiple dependencies and resiliency tiers at play.

In view of the foregoing, a need exists for a consistent application architecture diagram solution that monitors the interaction of applications and components in real-time as part of a development lifecycle and automatically generates a visualization of various metrics of the architecture for compliance to standards and identification of resiliency risks. Embodiments of the present disclosure are directed to this and other considerations.

SUMMARY

Aspects of the disclosed technology include systems and methods generate and update in real-time, application architecture, and associated system context diagrams through machine-readable code. Certain aspects of the disclosed technology enable real-time evaluation of the architecture for compliance to standards and identification of resiliency risks.

In one exemplary implementation of the disclosed technology, a system is provided that includes one or more processors, a system of record (SoR) in communication with the one or more processors, a rules engine in communication with the SoR, an output engine in communication with the rules engine, and memory in communication with the one or more processors and storing instructions that, when executed by the one or more processors, are configured to cause the system to receive, at the rules engine, machine-readable code describing interactions among a plurality of applications in a software architecture, evaluate, with the rules engine, compliance of the interactions among the plurality of applications according to the SoR, identify, with the rules engine, and based on compliance evaluation, one or more dependencies among the plurality of applications, generate, with the output engine, a system context diagram image comprising a graphical representations of the plurality of applications with associated interactions and dependencies; and output, for display, the system context diagram image.

Another aspect of the disclosed technology is a computer-implemented method that includes receiving, at a rules engine, machine-readable code describing interactions among a plurality of applications in software architecture, evaluating, with the rules engine in communication with a system of record (SoR), compliance of the interactions among the plurality of applications according to the SoR, identifying, with the rules engine, and based on compliance evaluation, one or more dependencies among the plurality of applications, generating, with an output engine, a system context diagram image comprising graphical representations of the plurality of applications with associated interactions and dependencies, and outputting, for display, the system context diagram image.

A further aspect of the disclosed technology includes a non-transitory computer-readable storage medium storing instructions that are configured to cause one or more processors to perform a method of receiving, at a rules engine, machine-readable code describing interactions among a plurality of applications in software architecture, evaluating, with the rules engine in communication with a system of record (SoR), compliance of the interactions among the plurality of applications according to the SoR, identifying, with the rules engine, and based on compliance evaluation, one or more dependencies among the plurality of applications, generating, with an output engine, a system context diagram image comprising graphical representations of the plurality of applications with associated interactions and dependencies, and outputting, for display, the system context diagram image.

Further features of the present disclosure, and the advantages offered thereby, are explained in greater detail hereinafter regarding specific embodiments illustrated in the accompanying drawings, wherein like elements are indicated by like reference designators.

BRIEF DESCRIPTION OF THE DRAWINGS

Reference will now be made to the accompanying drawings, which are not necessarily drawn to scale, and which are incorporated into and constitute a portion of this disclosure, illustrate various implementations and aspects of the disclosed technology and, together with the description, explain the principles of the disclosed technology.

DETAILED DESCRIPTION

The disclosed technology relates to informed software architecture systems and methods that enable the automatic generation of a system context diagram through a machine-readable code. The systems and methods disclosed herein enable real-time assessment of software architecture, for example, to identify critical dependencies with interacting applications that could cause the system to fail or stay offline for longer than a specified objective time. One aspect of the disclosed technology includes a system of record and an embedded rules engine that is configured to automatically evaluate the architecture for compliance with corporate standards and resiliency risks. Certain implementations may generate an alert when a rule violation is detected.

The disclosed technology provides tangible improvements over previous confluence-based static documents, which are not query-able for compliance rules. Certain aspects of the disclosed technology may provide a dynamic and auditable architecture that is well managed per source code best practices, and query-able for compliance rules. Generating architecture-through-code informed by a system of record, as discussed herein, may enable an increased execution speed, scale, and sustainability by enabling application architects to generate and verify diagrams quickly through a consistent interface. Certain implementations of the disclosed technology may provide improvements in Build Review and Launch Readiness (BRLR) over prior static diagram systems.

Some implementations of the disclosed technology may be embodied in many different forms and should not be construed as limited to the examples set forth herein. The mention of one or more method steps does not preclude the presence of additional method steps or intervening method steps between those steps expressly identified.

Reference will now be made in detail to exemplary embodiments that are illustrated in the accompanying drawings and disclosed herein. Wherever convenient, the same reference numbers will be used throughout the drawings to refer to the same or like parts.

Figure 1:
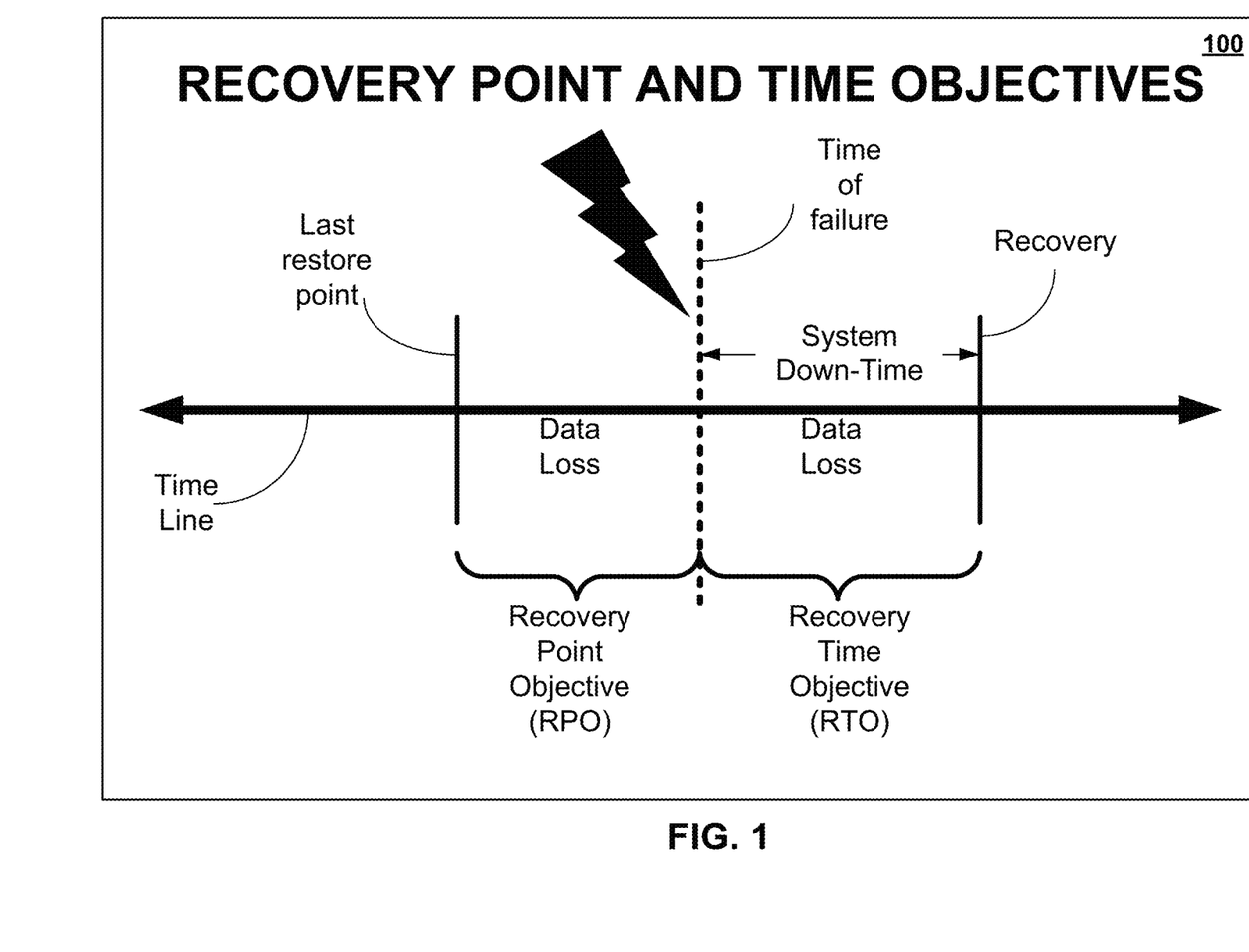
FIG. 1 is an illustration of an example time-line 100 showing a recovery point objective (RPO) period and a recovery time objective (RTO) period relative to a time of failure, according to the disclosed technology.

FIG. 1 illustrates an example timeline showing a recovery point objective (RPO) and a recovery time objective (RTO) of a system relative to a time of failure. The RPO represents a maximum period allowed for the system between the last restore point and a time of failure. As with any computer system that can fail, there is a small risk that recent (non-backed up) data will be lost due to a failure event, however, the RPO can be reduced by requiring a more frequent backup schedule. The RTO represents a maximum amount of down-time that may be tolerated. As indicated, data loss can also occur during the system downtime after the failure event. Thus, it is often an objective in system architecture design to ensure that the system can quickly recover after a failure event and adhere to the RTO specification. Since system down-time can be influenced by a chain of application dependencies, an objective of the disclosed technology is to automatically evaluate the architecture in real-time for such dependencies to enable compliance to RTO standards and for identification of resiliency risks, as informed by a system of record, so that such risks can be mitigated.

Under certain exemplary implementations of the disclosed technology, a "critical dependency" may be defined as a dependency that an application relies upon to operate normally. Successful execution of a first application, for example, may depend on a respective successful execution and completion of a second application, making the first application critically dependent on the second application. Following certain exemplary implementations of the disclosed technology, if the RTO of the second application is greater than the RTO of the first application, then there is a potential resiliency risk introduced in the overall architecture that may be automatically identified by the disclosed technology and addressed accordingly. In certain exemplary implementations, the system may highlight the potential resiliency risks in real-time while generating the system context diagram.

Figure 2:
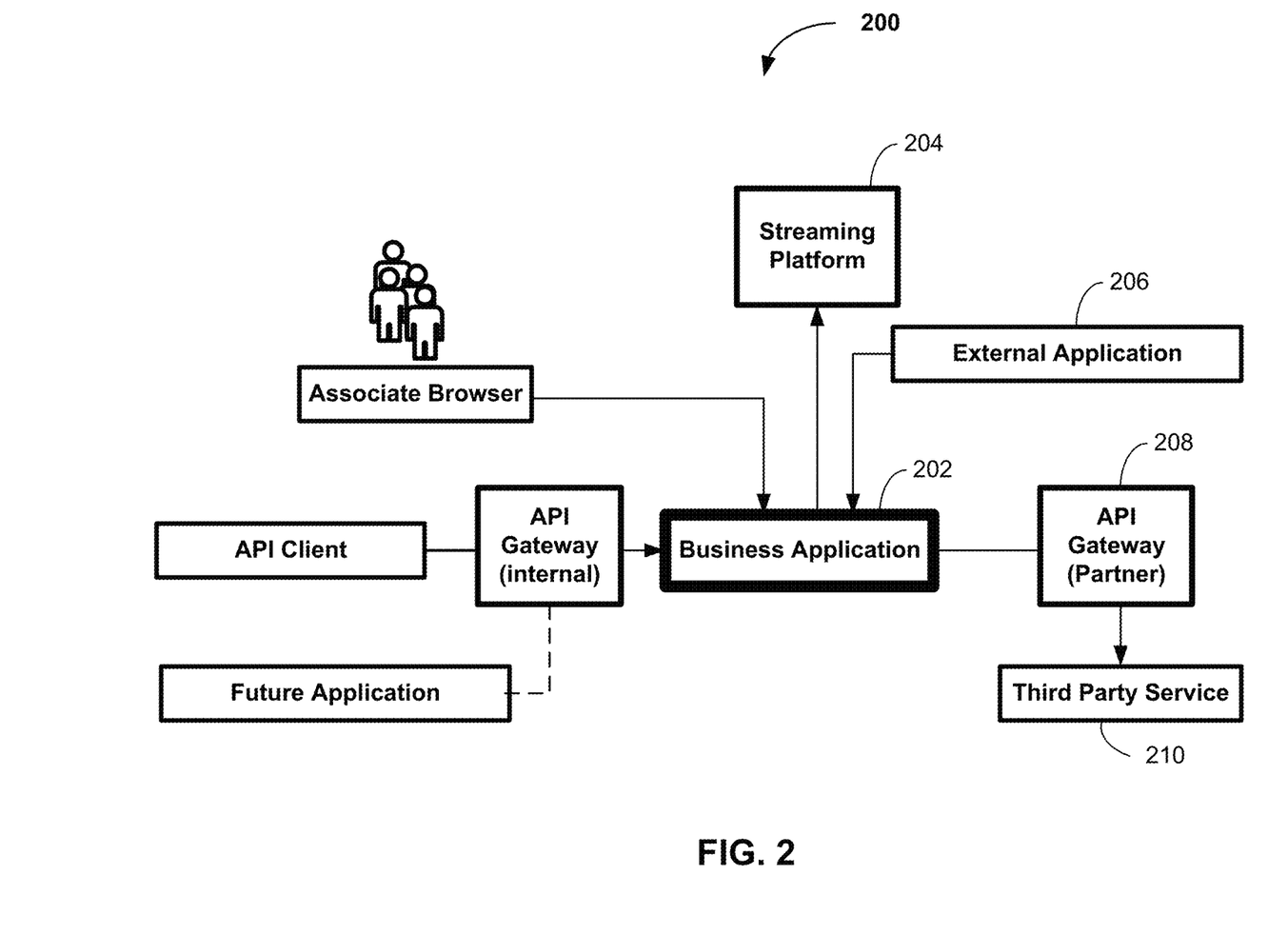
FIG. 2 depicts a typical static system context diagram 200 that does not accurately reflect the real-time dependencies of the system and may not be queryable for compliance rules.

FIG. 2 depicts a typical static system context diagram 200 that may show high-level connections between various processes and applications but may not accurately reflect the real-time dependencies of the system. Furthermore, the static system context diagram 200 may not be queryable for compliance rules. A business application 202, for example, may interact with a third-party service 210 through partner API Gateway 208. The business application 202 may rely on an external application 206 to process data received by the third-party service 210 before the content is released on a streaming platform 204. Thus, a delay or failure in the external application 206, the third-party service 210, or the API Gateway 208 could, in turn, cause a delay or failure in releasing content on the streaming platform 204. As may be appreciated, a static system context diagram 200 may not provide sufficient warning to avoid a recovery time objective violation. Furthermore, the static system context diagram 200 may lack the ability to provide details needed to audit the system for compliance or to provide meaningful information when there is an actual critical dependency violation.

Figure 3:
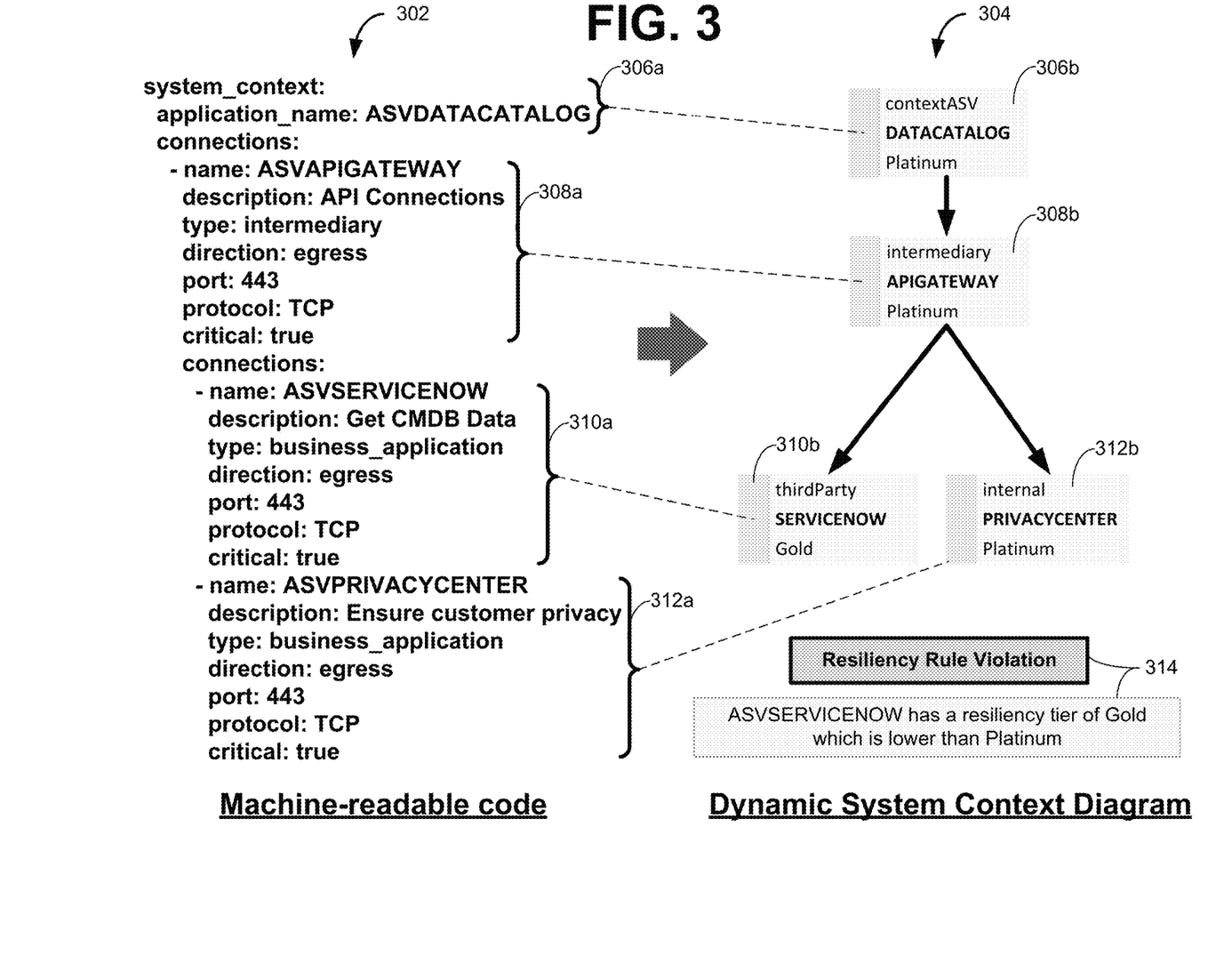
FIG. 3 is an example of machine-readable code 300 (left pane) that may be utilized to generate and/or update a dynamic system context diagram 304 (right pane) in real-time according to certain implementations of the disclosed technology.

FIG. 3 illustrates an example of machine-readable code 302 that may be utilized to generate and/or update a dynamic system context diagram 304 in real-time according to certain implementations of the disclosed technology. In this example, sections 306*a*, 308*a*, 310*a*, 312*a*, of the machine-readable code may be utilized to automatically generate respective corresponding graphical representations 306*b*, 308*b*, 310*b*, 312*b* of the system context diagram 304. As will be further discussed below, a Configuration Management Database (CMDB) System of Record (SoR) may be utilized in conjunction with the machine-readable code 302 to further inform the underlying architecture, for example, so that a rules engine may check the critical dependencies among the various applications for possible resiliency violations.

By certain exemplary implementations of the disclosed technology, the SoR may be embodied as an information storage system (as will be discussed below with respect to FIG. 4) that is the authoritative data source for a given data element or piece of information. In certain exemplary implementations, the generation of the SoR may involve taking output data from multiple source systems, re-processing this data, and then re-presenting the result. In cases where multiple information systems may disagree about the same piece of information, such disagreements may stem from semantic differences, differences in opinion, use of different sources, differences in the timing of the extract, transform, load processes that create the data they report against, or may simply be the result of bugs. The integrity and validity of the data used for the SoR may be traceable.

In the example system context diagram 304 depicted in FIG. 3, a central reference application DATACATALOG 306*b* is connected to a third party application SERVICE-NOW 310*b* and an internal application called PRIVACY-CENTER 312*b* via an intermediary APIGATEWAY 308*b*. The ingress/egress designation is from the perspective of the system connecting. For example, the APIGATEWAY 308*b* is egressing to SERVICENOW 310*b* to connect from API-GATEWAY 308*b* to SERVICENOW 310*b*. While not shown, the CMDB SoR may store (and inform) each of the represented applications with RTO tier designations. For example, an application having a Platinum tier designation can signify that its RTO is 15 minutes, whereas an application with a Gold tier designation may have an RTO of 4 hours, where the RTO represents a maximum amount of down-time that may be tolerated. Thus, in terms of resiliency, a Gold tier is lower than a Platinum tier. In certain exemplary implementations, input for generating dynamic system context diagram 304 may be a combination of the machine-readable code 302, plus a system record of all the associated dependencies.

To illustrate a resiliency violation for the central reference application DATACATALOG 306*b*, consider an example scenario where the SERVICENOW 310*b* application goes down. The Gold tier designation (RTO=4 hours) of SERVICENOW 310*b* indicates that SERVICENOW 310*b* would not violate its own tier provided it remains down for less than 4 hours. However, since DATACATALOG 306*b* has a Platinum tier designation (RTO=15 minutes) and since DATACATALOG 306*b* is critically dependent on SERVICENOW 310*b*, a 1-hour outage of SERVICENOW 310*b* would, in theory, cause a 1-hour outage of DATACATALOG 306*b*, which would exceed the allowed 15 minutes RTO for the DATACATALOG 306*b* designated tier.

One of the advantages of the systems and methods disclosed herein is that possible RTO and/or resilience rule violation can be automatically detected and a corresponding alert 314 may be displayed in the dynamic system context diagram 304 before an actual violation occurs. Since resiliency tiers may not be static, and they can change with time, certain implementations of the disclosed technology may perform real-time, dynamic evaluation of the system context diagram 304 and associated dependencies based on authoritative data to detect resilience rule violations and provide valuable time-saving alerts so that the critical dependency and associated risk can be mitigated.

In the specific illustration shown in FIG. 3, the "ASV" designation may be used as a primary prefix in the CMDB, whereas the corresponding logical name (e.g., DATACATALOG) may be displayed in the diagram. Certain implementations of the disclosed technology may utilize "Architecture as Code" i.e., the architecture drawings in the dynamic system context diagram 304 may be informed by the CMDB SoR, which may ensure that accurate data is used to update the dynamic system context diagram 304, thus providing a significant advantage over prior art static diagrams. In certain exemplary implementations, if the logical name of the application changes in the CMDB SoR, the corresponding name in the dynamic system context diagram 304 may be automatically updated with the corresponding change. Furthermore, the RTO tier designation is a property of the application and may be stored in the CMDB SoR. Thus, in certain implementations, the dynamic system context diagram 304 references the CMDB SoR to ensure the accurate RTO tier designation is included (rather than a stale RTO tier designation done at the time a static diagram is created). This helps ensure that as systems change, resiliency risk can be automatically validated to ensure that no violation risks have been introduced due to a dependency RTO update.

The machine-readable code 302 is illustrated as descriptive language as-code in the YAML format, however other languages and formats may be utilized, as will be recognized by those having skill in the art. Nevertheless, YAML may be a suitable choice as a format for representing part of the underlying structure and interaction of the applications and components in the system context diagram because (a) YAML is fairly easy to read by humans; (b) YAML structures enable storage of multiple documents within a single file; (c) YAML structures enable the usage of references for repeated nodes; (d) YAML autodetects simple types, so it doesn't need to be explicit, meaning that floating, integers, strings, lists, or maps don't need explicit categorizing; (e) YAML does not require closing tags, braces, or quotation marks to balance; and/or (d) YAML structures enable the usage of arbitrary nodes as keys. This makes it very easy to write parsers that do not have to process a document in its entirety (e.g. balancing opening and closing tags and navigating quoted and escaped characters) before they begin extracting specific records referenced within the code. This property of YAML may allow iterating in a single, stateless pass, over records in a file whose entire data structure is too large to hold in memory, or for which reconstituting the entire structure to extract one item would be prohibitively expensive.

As will be appreciated by those having skill in the art, the disclosed technology enables the generation and real-time assessment of consistent authored diagrams from machine-readable code, with a consistent look and feel using automated data from authoritative sources.

Figure 4:
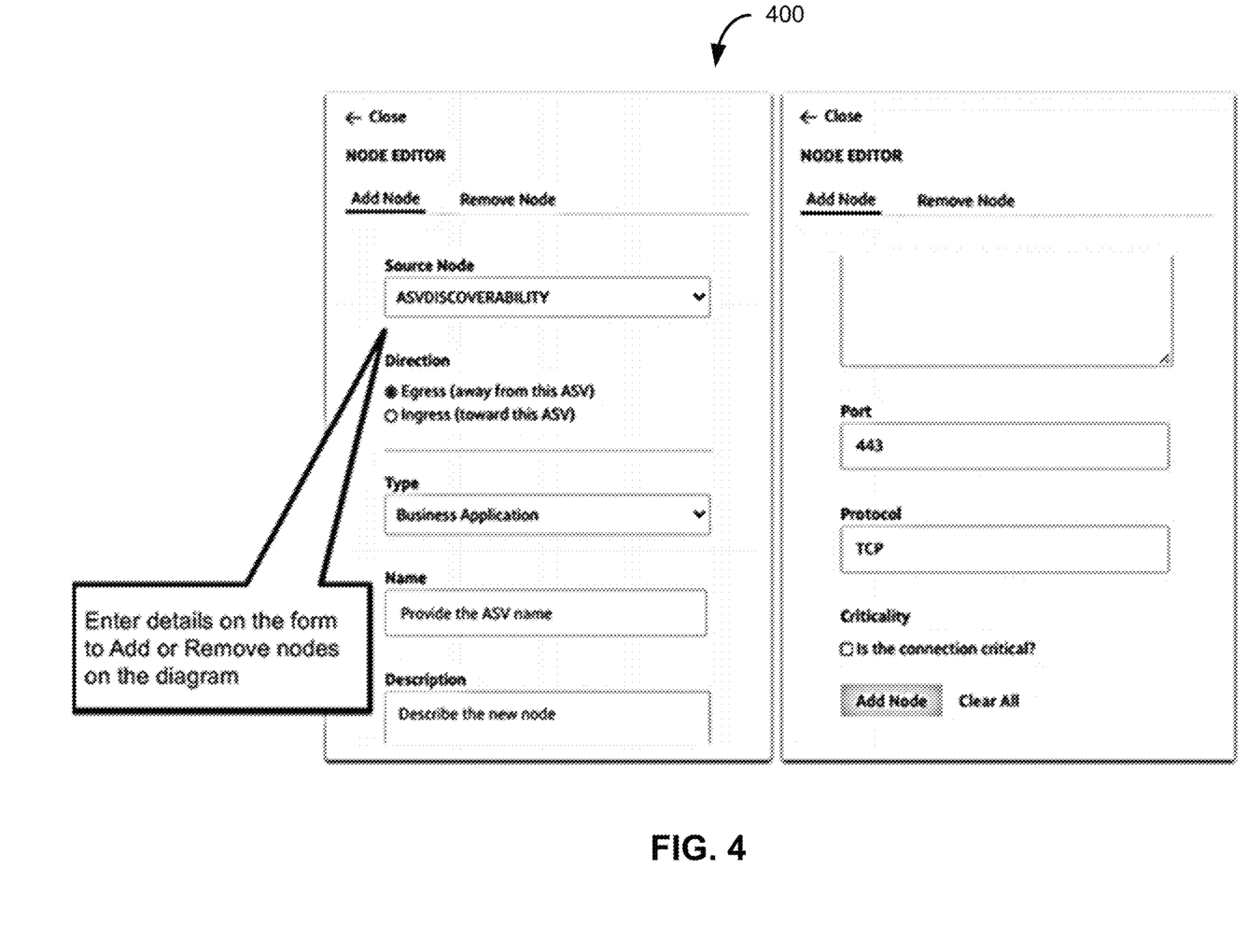
FIG. 4 is an illustration of an example node editor 400, according to an example implementation of the disclosed technology.

FIG. 4 is an illustration of an example node editor 400, according to an example implementation of the disclosed technology, which may be utilized as a simplified user interface for entering the various names and parameters for generation of the machine-readable code 302 and/or system context diagram 304, as discussed above with reference to FIG. 3. In certain exemplary implementations, the node editor 400 may allow a user to populate the system diagram without requiring the user to have coding skills.

Figure 5:
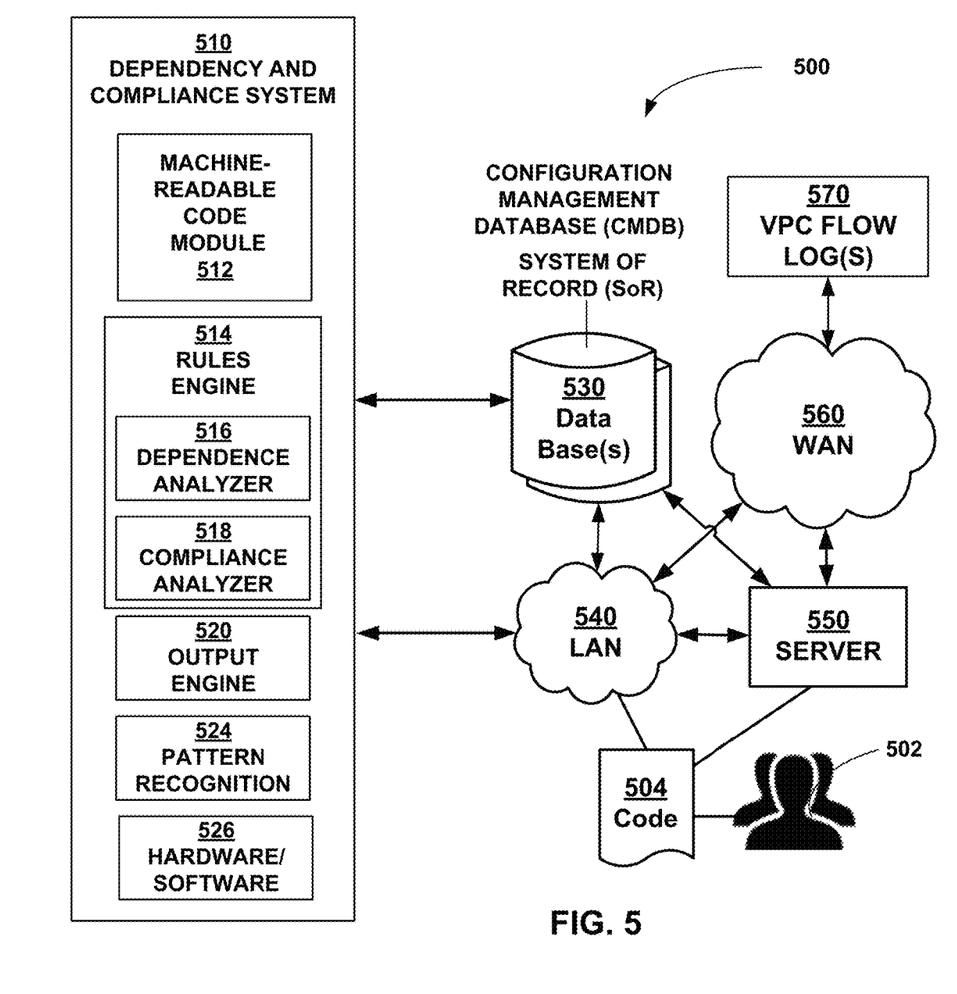
FIG. 5 depicts an example environment and system 500, according to certain implementations of the disclosed technology.

FIG. 5 is a block diagram of an example environment and system 500 that may be used for working with application architecture and generating associated system context diagrams through machine-readable code. In certain exemplary implementations, the system 500 may perform a real-time evaluation of the architecture for compliance to standards and identification of resiliency risks. The system 500 may enable software developers 502 to interact with a dependency and compliance system 510 via one or more of a local area network 540, a server 550, and a wide area network 560 (such as the Internet).

The system 500 may be configured to monitor network traffic via one or more virtual private cloud (VPC) flow logs 570, for example, to obtain a real-time view of IP traffic data on network interfaces of the VPC and/or between associated modules. For example, the system 500 may utilize one or more Amazon Web Services (AWS) VPC flow logs to capture real-time network traffic data. In certain exemplary implementations, structures of the network traffic data may be generated from the VPC flow log 570, and a difference analysis may be performed to verify whether the traffic is indicative of an intended connection and flow to associated nodes, modules, etc. In certain exemplary implementations, VPC flow log 570 analytics may be utilized to query and/or diagnose upstream and downstream dependencies. In certain exemplary implementations, machine-readable code (such as YAML) may inform the system context diagram and associated data may be stored into a centralized data warehouse or data lake and may be used for analytic purposes. As discussed above with respect to FIG. 3 and FIG. 4, the code 504 may be in the form of machine-readable code, or it may be generated via a node editor.

In accordance with certain exemplary implementations, the dependency and compliance system 510 can include one or more components, modules, and/or hardware 512-526 configured to perform certain specialized functions associated with the analysis and generation of a system context diagram responsive the code 504 being submitted to the dependency and compliance system 510. The dependency and compliance system 510 may be in communication with the one or more databases 530, which can include a Configuration Management Database (CMDB) and/or a System of Record (SoR). In certain exemplary implementations, the one or more databases 530 may store network traffic information, snapshots, and associated data from the VPC Flow Log 570. In certain exemplary implementations, the one or more databases 530 may be configured as a repository to store the various code, rules, analysis results, etc.

In certain exemplary implementations, the dependency and compliance system 510 can include a machine-readable code module 512 that may perform some or all of the functions that allow processing machine-readable data or computer-readable data, which may be defined as data in a format that can be easily processed by a computer without human intervention while ensuring no semantic meaning is lost. While machine-readable code examples used herein are in the YAML format, other formats such as CSV, RDF, XML, JSON, HTML, etc., may be utilized as appropriate without departing from the scope of the disclosed technology.

According to an exemplary implementation of the disclosed technology, the system 510 can include a rules engine 514, which may include a dependence analyzer module 516 and/or a compliance analyzer module 518. In accordance with certain exemplary implementations of the disclosed technology, the rules engine 514 may interact with the machine-readable code module 512 and SoR (for example, as stored in the one or more databases 530) to check for dependencies within a system context diagram that is represented by machine-readable code. In some implementations, the rules engine 514 may automatically identify vulnerabilities. Per certain exemplary implementations of the disclosed technology, the system 510 can include an output engine 520, which may generate and output, in a graphical format, at least a portion of information generated by the rules engine 514.

Following certain exemplary implementations of the disclosed technology, the dependence analyzer module 516 may be utilized to process SoR data using stored application information referenced by, but not necessarily explicitly included the machine-readable code 504. In this respect, the machine-readable code 504 may be simplified to represent basic ingress/egress, flow, application connection, etc., without requiring the user 502 to keep track of the various tiers, dynamic dependencies, etc., of the associated applications in the system context diagram. Rather, such information may be stored as multiple SoRs (for example, on one or more databases 530) and aggregated as needed with the machine-readable code.

By certain exemplary implementations of the disclosed technology, the dependence analyzer module 516 of the rules engine 514 may work with a compliance analyzer module 518, for example, to analyze the machine-readable code 504 using the SoR and information determined by the dependence analyzer module 516 to detect and/or identify applications and dependencies referenced in the machine-readable code 504 that have potential (and/or actual) resiliency rule violations and/or other compliance issues. For example, the rules engine 514 in conjunction with the SoR may be configured to evaluate compliance to certain regulatory standards, such a Payment Card Industry (PCI) standards. As outlined in the "PCI Quick Reference Guide, Understanding the Payment Card Industry, Data Security Standard version 1.2," which is incorporated herein by reference, the PCI provides standards for building and maintaining a secure network, protecting cardholder data, maintaining a vulnerability management program, etc. Certain implementation of the disclosed technology may be utilized to assist in the evaluation of a system's adherence to certain PCI standards and other quality standards, for example, via the rules engine 514, associated modules, and SoR information as discussed above.

Per certain exemplary implementations of the disclosed technology, the rules engine 514 may enable the evaluation of rules against different dimensions. For example, in some implementations, an application may have a lower-tier dependency unless it is considered critical. In certain exemplary implementations, critical dependencies associated with the system context diagram may be identified in real-time, as the system context diagram is being architected. One advantage provided by the disclosed technology is that the machine-readable code may be evaluated without requiring code to be compiled.

In certain exemplary implementations, a resiliency risk associated with an identified problematic dependency of an application may be captured and utilized by a pattern recognition module 524, for example, which may be utilized to automatically remediate issues in a system context diagram based on matching patterns of previously detected and remediated dependency issues. In some implementations, the pattern recognition module 524 may be utilized to identify similar previously remediated vulnerabilities via corresponding changed lines of code. In certain exemplary implementations, the pattern recognition module 524 may process the associated generalized differences made between the initial problematic line(s) of code and the suggested or actual associated revisions so that subsequently encountered similar issues in code 504 may be automatically addressed in the same (or similar) way.

Per certain exemplary implementations of the disclosed technology, the pattern recognition module 524 may scan machine-readable code 104 that is submitted to the system 510 and find matching dependencies that have been previously remediated. The pattern recognition module 524 may utilize historical information gathered from the analysis of previous code to make similar changes done in previously tested code 504. In certain exemplary implementations, the remediations may be done automatically. In some implementations, the remediations may be done selectively. In some implementations, the remediations may be done for a particular selected class of vulnerability. Following certain exemplary implementations of the disclosed technology, remediations may include changes to syntax, library calls, object-oriented constructs, external interaction function calls, etc. For machine-readable code 504 associated with a system context diagram, the system 510 may calculate a dynamic vulnerability score. In one implementation the score may be a numeric value. In another exemplary implementation, the score may be normalized to a 100-point scale, among other possibilities. In certain exemplary implementations, the score may take into account the age of specific findings and the frequency of finding. In certain exemplary implementations, an overall score may be recomputed and adjusted accordingly as scores are adjusted.

Certain hardware and software 526 of the system 510 may be utilized to carry out some or all of the functions and processes discussed above, as will be discussed below concerning FIG. 6.

Figure 6:
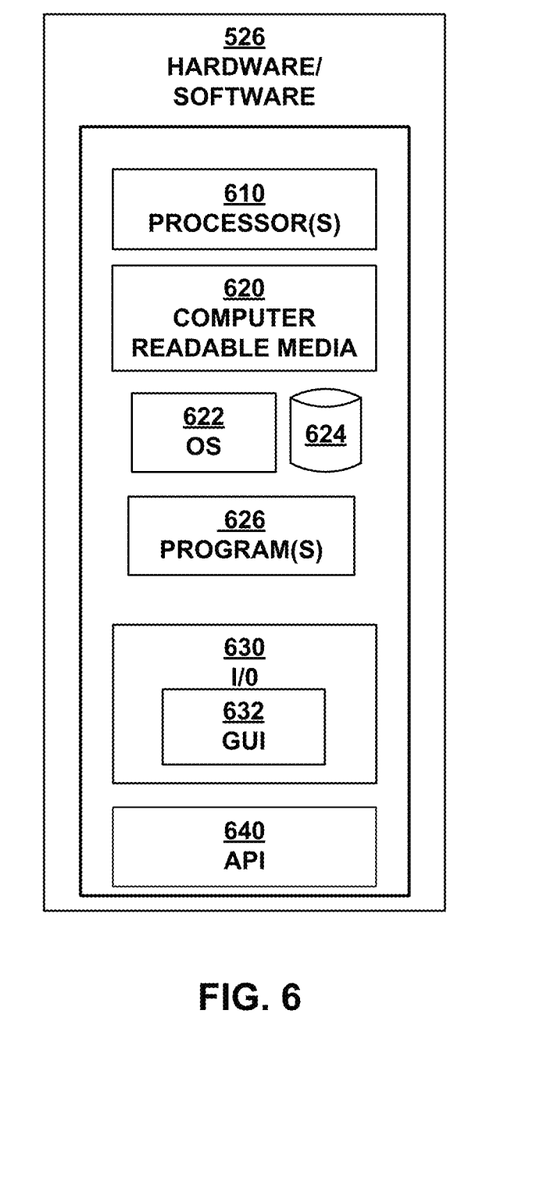
FIG. 6 depicts an example hardware/software system 526, according to certain implementations of the disclosed technology.

FIG. 6 is an expanded block diagram of the example hardware and software 526 components (as also illustrated and discussed above concerning FIG. 5), according to an aspect of the disclosed technology, which may include one or more of the following: one or more processors 610, a non-transitory computer-readable medium 620, an operating system 622, memory 624, one or more programs 626 including instructions that cause the one or more processors 610 to perform certain functions; an input/output ("I/O") device 630, and an application program interface (API) 640, among other possibilities. The I/O device 630 may include a graphical user interface 632.

Figure 7:
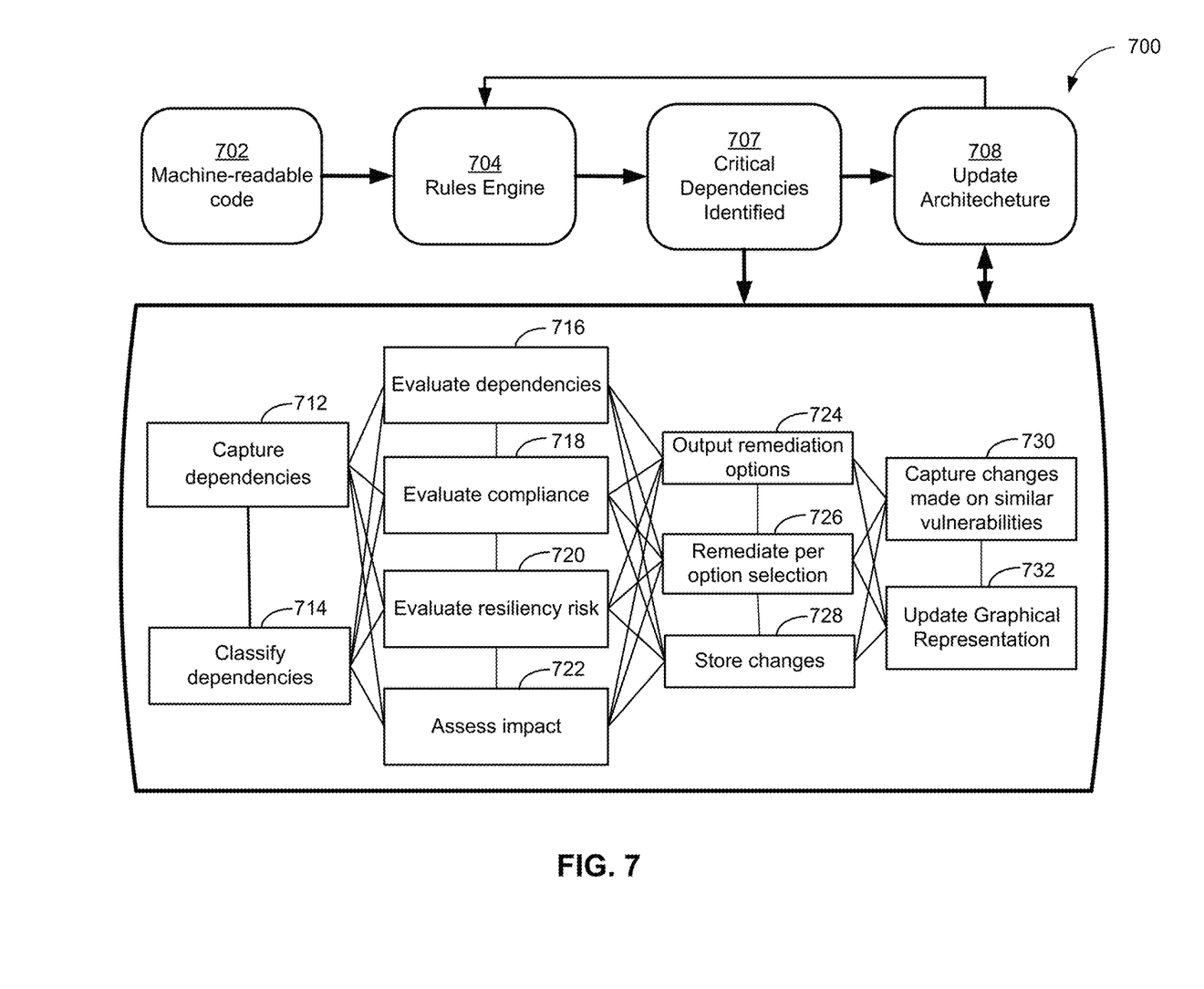
FIG. 7 is an example flow chart of various processes 700 that may be performed by the system according to certain example implementations of the disclosed technology.

FIG. 7 illustrates an example flow chart of a process 700 that may be performed by the dependency and compliance system 510 as discussed concerning FIG. 5. The process 700 may be initiated responsive to receiving machine-readable code 702 for the generation of a system context diagram. In this example, the code 702 may be submitted to the rules engine 704, which may be designed to analyze the code 702 to identify critical dependencies 706 so that the code and associated system architecture may be updated 708. In certain implementations, after the code/architecture is updated 708, results may be resubmitted to the rules engine 704 for subsequent testing. In certain exemplary implementations, code differences between updates may be captured and tokenized. The tokens may then be utilized to find and remediate similar issues in subsequent submissions of code 702.

In certain exemplary implementations, a plurality of subprocesses 712-732 may work in sequence, parallel, or a combination, as appropriate. Per certain example implementations, a listing of actual and/or potential dependencies may be captured 712. In some implementations, the potential critical dependencies may be classified 714, for example, so that similar dependency patterns (and associated remediations) may be pooled for training a machine-learning model to automatically correct machine-readable code 702 and/or the associated system context diagram having dependency patterns that match with similar (remediated) historical dependency patterns, which may be based on the difference between the code 702 before and after the remediation. In certain exemplary implementations, generalized code for each classification of dependency may be tokenized and used to locate and correct similar dependency issues. In certain implementations, such tokens may be applied to the current revised version of code 702 (i.e., used immediately for subsequent lines in the code under test). In other implementations, the generated tokens may be used in subsequent code 702 submissions or revisions.

Per certain exemplary implementations of the disclosed technology, the process 700 may perform one or more of: evaluating dependencies 716 among applications referenced in the code 702, evaluating compliance 718 of the dependencies, evaluating resiliency risk 720, and/or assessing the impact 722 of the dependencies. According to certain aspects, the impact assessment 722 may be determined, for example, based on the evaluated dependencies 716, evaluated compliance 718, evaluated resiliency risk 722, and/or a remediation plan.

Per certain exemplary implementations of the disclosed technology, the dependencies 712 may be classified 714 according to various recover time objectives, resiliency rule violations, and/or security-related issues including but not limited to: code injection, broken authentication, sensitive data exposure, XML external entities, broken access control, security misconfiguration, cross-site scripting, insecure deserialization, use of components with known vulnerabilities, insufficient logging, insufficient monitoring, cross-site request forgery, unvalidated redirects and forwards, etc.

The process 700 may include generating and outputting remediation options 724, remediating the code 702 according to selected remediation options 726, and/or storing changes 728 to the code 702 before and after the remediation. Certain implementations may capture changes made on similar vulnerabilities 730 or critical dependencies. Certain implementations may update the graphical representation 732 of the system context diagram responsive to changed code 702. In some implementations, a remediation plan may be utilized to update the code 702 automatically. In other example implementations, the remediation plan may be presented for selective updating of the code 702, for example, based on the class(es) of vulnerabilities, dependencies, risks, security-related issues, etc.

Figure 8:
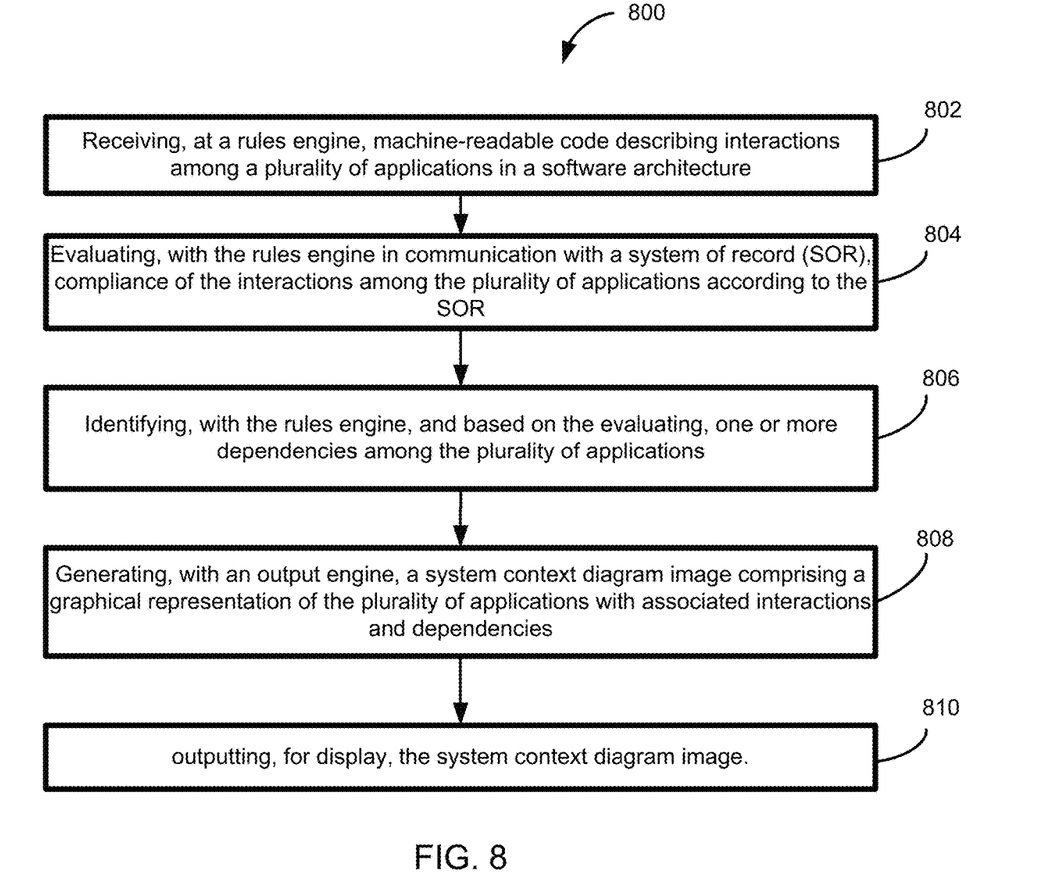
FIG. 8 is an example flow chart of a method 800, according to an example implementation of the disclosed technology.

FIG. 8 is an example flow chart of a method 800, according to an example implementation of the disclosed technology. In block 802, the method 800 includes receiving, at a rules engine, machine-readable code describing interactions among a plurality of applications in a software architecture. In block 804, the method 800 includes evaluating, with the rules engine in communication with a system of record (SoR), compliance of the interactions among the plurality of applications according to the SoR. In block 806, the method 800 includes identifying, with the rules engine and based on the evaluating, one or more dependencies among the plurality of applications. In block 806, the method 800 includes generating, with an output engine, a system context diagram image comprising a graphical representation of the plurality of applications with associated interactions and dependencies. In block 810, the method 800 includes outputting, for display, the system context diagram image.

According to an exemplary implementation of the disclosed technology, the machine-readable code describes dynamic software architecture interactions among the plurality of applications.

Following certain exemplary implementations of the disclosed technology, the machine-readable code may be in a YAML format.

In certain implementations, the rules engine utilizes authoritative data stored in the SoR for evaluating the compliance of the interactions among the plurality of applications against one or more corporate standards and/or resiliency risks.

Certain implementations may include evaluating and identifying one or more critical dependencies among the plurality of applications. Certain implementations can include generating unique graphical representations of one or more critical dependencies.

Some implementations may include one or more of determining similarities among the critical dependencies, pooling similar critical dependencies, and/or storing the pooled similar critical dependencies in a repository.

Certain implementations may include determining an overall risk score for the software architecture by computing a weighted average of each field of the machine-readable code associated with the one or more critical dependencies according to one or more of a dependency type and a dependency severity.

In certain exemplary implementations, when the system context diagram is published (for example, by the output engine 520) cascading dependencies may be analyzed and the associated dependency data may be sent to a Data Lake. In some implementations, system outages may be compared with a list of intended Critical Dependencies, for example, to identify the reason for the outage. As discussed herein, the Data Lake may be embodied as a centralized repository (such as one or more databases 530 discussed regarding FIG. 5) that allows storage of structured and unstructured data at any scale. In some implementations, the data may be stored as-is, without having to first structure the data for real-time analytics and/or machine learning. The Data Lake may allow importing, from multiple sources, any amount of data in its original format in real-time. Certain implementations may utilize the Data Lake scale to data without requiring defining data structures, schema, and/or transformations. Furthermore, analytics may be run without the need to move data to a separate analytics system. In certain exemplary implementations, the use of the Data Lake may allow the generation of different types of insights including but not limited to: reporting on historical data, performing machine learning where models are built to forecast likely outcomes and suggest a range of prescribed actions to achieve the optimal result.

Per certain exemplary implementations of the disclosed technology, architecture dependency data that is stored in the Data Lake may be utilized to analyze for known patterns and/or to detect unknown patterns. Such automated learning may serve as a feedback loop when incorporating data from actual application failures that occur and strengthen the soundness of the patterns, which will in turn reduce the time to market for engineering new systems.

In certain exemplary implementations, Machine learning may be utilized to detect adherence to approved architecture patterns, for example, to confirm that the associated applications are built following best practices. Consequently, such machine learning may help greatly reduce the mean time to detection of and recovery, particularly if the application is built following approved patterns.

While certain implementations of the disclosed technology have been described in connection with what is presently considered to be the most practical and various implementations, it is to be understood that the disclosed technology is not to be limited to the disclosed implementations, but on the contrary, is intended to cover various modifications and equivalent arrangements included within the scope of the appended claims. Although specific terms are employed herein, they are used in a generic and descriptive sense only and not for purposes of limitation. Throughout the specification, the term "exemplary" has been used to reference certain embodiments. This term is intended to mean "example" and does not mean "best" or "preferred."

Certain implementations of the disclosed technology are described above concerning block and flow diagrams of systems and methods and/or computer program products according to example implementations of the disclosed technology. It will be understood that one or more blocks of the block diagrams and flow diagrams, and combinations of blocks in the block diagrams and flow diagrams, respectively, can be implemented by computer-executable program instructions. Likewise, some blocks of the block diagrams and flow diagrams may not necessarily need to be performed in the order presented or may not necessarily need to be performed at all, according to some implementations of the disclosed technology.

These computer program instructions may also be stored in a computer-readable memory that can direct a computer or other programmable data processing apparatus to function in a particular manner, such that the instructions stored in the computer-readable memory produce an article of manufacture including instruction means that implement one or more functions specified in the flow diagram block or blocks.

Implementations of the disclosed technology may provide for a computer program product, comprising a computer-usable medium having a computer-readable program code or program instructions embodied therein, said computer-readable program code adapted to be executed to implement one or more functions specified in the flow diagram block or blocks. The computer program instructions may also be loaded onto a computer or other programmable data processing apparatus to cause a series of operational elements or steps to be performed on the computer or other programmable apparatus to produce a computer-implemented process such that the instructions that execute on the computer or other programmable apparatus provide elements or steps for implementing the functions specified in the flow diagram block or blocks.

Accordingly, blocks of the block diagrams and flow diagrams support combinations of means for performing the specified functions, combinations of elements or steps for performing the specified functions and program instruction means for performing the specified functions. It will also be understood that each block of the block diagrams and flow diagrams, and combinations of blocks in the block diagrams and flow diagrams, can be implemented by special-purpose, hardware-based computer systems that perform the specified functions, elements or steps, or combinations of special-purpose hardware and computer instructions.

This written description uses examples to disclose certain implementations of the disclosed technology, including the best mode, and also to enable any person skilled in the art to practice certain implementations of the disclosed technology, including making and using any devices or systems and performing any incorporated methods. The patentable scope of certain implementations of the disclosed technology is defined in the claims and may include other examples that occur to those skilled in the art. Such other examples are intended to be within the scope of the claims if they have structural elements that do not differ from the literal language of the claims, or if they include equivalent structural elements with insubstantial differences from the literal language of the claims.

USE CASES

Certain exemplary use cases are discussed below for utilizing systems and methods disclosed herein to generate a dynamic system context diagram using machine-readable code. These use case examples are intended solely for explanatory purposes and are not intended to limit the disclosed technology.

The use of architecture-as-code, as discussed herein, may enable rapid identification of critical dependency architecture artifacts through versioned configuration files, enabling engineers and architects to document both critical and non-critical dependencies. In one exemplary use case, analyses can be performed against critical dependencies by using supplementary SoR data to help quantify risk associated with an application's dependency on another. For example, if it is found during an analysis that a first application (for which other applications are critically dependent on) has a history of instability and outages caused by software changes, bad operational practices, etc., a higher risk score can be associated with this first application. Accordingly, a risk score can be used by other systems to determine stricter requirements for such high-risk applications.

In another use case, system architects may periodically revisit an application's planned design and compare it against the actual state of the application. Actual network traffic may be monitored and used as a representation of the current state of an application. In certain implementations, the network traffic can be compared to the data used in the system context diagram. Differences in the data may represent a departure from the intended design and can serve as the basis for remediation and/or explanation.

In another exemplary use case, engineers and architects can use the machine readable data to ensure compliance with Payment Card Industry (PCI) network segmentation standards. Applications of each individual PCI category may be segregated such that applications that process primary account numbers (PCI Category 1) have no direct connections with applications that do not process this data (PCI Category 3). PCI categorization data may be stored in the system of record (SoR) and when the machine readable code is augmented with this data, a rules engine can automate the discovery of these inconsistencies.

What is claimed is:

1. A system, comprising:
   one or more processors;
   a system of record (SoR) in communication with the one or more processors;
   a rules engine in communication with the SoR;
   an output engine in communication with the rules engine;
   memory in communication with the one or more processors and storing instructions that, when executed by the one or more processors, are configured to cause the system to:
     receive, at the rules engine, machine-readable code describing interactions among a plurality of applications in a software architecture;
     evaluate, with the rules engine, compliance of the interactions among the plurality of applications according to the SoR;
     identify, with the rules engine, and based on compliance evaluation, one or more dependencies among the plurality of applications;
     generate, with the output engine, a system context diagram image comprising a graphical representation of the plurality of applications with associated interactions and dependencies; and
     output, for display, the system context diagram image.

2. The system of claim 1, wherein the machine-readable code describes dynamic software architecture interactions among the plurality of applications.

3. The system of claim 1, wherein the machine-readable code is in a YAML format.

4. The system of claim 1, wherein the rules engine utilizes authoritative data stored in the SoR to evaluate the compliance of the interactions among the plurality of applications against corporate standards or resiliency risks.

5. The system of claim 1, wherein the instructions further cause the rules engine to evaluate and identify one or more critical dependencies among the plurality of applications.

6. The system of claim 5, wherein the instructions further cause the output engine to generate unique graphical representations of the one or more critical dependencies.

7. The system of claim 5, wherein the instructions further cause the rules engine to:
   determine similarities among the critical dependencies;
   pool similar critical dependencies; and
   store the pooled similar critical dependencies in a repository.

8. The system of claim 5, wherein the instructions are further configured to cause the rules engine to determine an overall risk score for the software architecture by computing a weighted average of each field of the machine-readable code associated with the one or more critical dependencies according to one or more of a dependency type and a dependency severity.

9. The system of claim 1, wherein the output engine is configured to generate a graphical representation of network traffic associated with one or more of the plurality of applications.

10. The system of claim 1, wherein the output engine is configured to generate a graphical representation of a resiliency risk for the software architecture.

11. The system of claim 1, wherein the instructions are further configured to cause the one or more processors to:
    output for display, a menu of one or more options for compliance remediation of the plurality of applications; and
    remediate the machine-readable code automatically according to a selected option.

12. A method, comprising:
    receiving, at a rules engine, machine-readable code describing interactions among a plurality of applications in a software architecture;
    evaluating, with the rules engine in communication with a system of record (SoR), compliance of the interactions among the plurality of applications according to the SoR;
    identifying, with the rules engine and based on the evaluating, one or more dependencies among the plurality of applications;
    generating, with an output engine, a system context diagram image comprising a graphical representation of the plurality of applications with associated interactions and dependencies; and
    outputting, for display, the system context diagram image.

13. The method of claim 12, wherein the machine-readable code describes dynamic software architecture interactions among the plurality of applications.

14. The method of claim 12, wherein the machine-readable code is in a YAML format.

15. The method of claim 12, wherein the rules engine utilizes authoritative data stored in the SoR for evaluating the compliance of the interactions among the plurality of applications against one or more of corporate standards and resiliency risks.

16. The method of claim 12, further comprising evaluating and identifying one or more critical dependencies among the plurality of applications.

17. The method of claim 16, further comprising generating unique graphical representations of the one or more critical dependencies.

18. The method of claim 16, further comprising:
    determining similarities among the critical dependencies;
    pooling similar critical dependencies; and
    storing the pooled similar critical dependencies in a repository.

19. The method of claim 16, further comprising determining an overall risk score for the software architecture by computing a weighted average of each field of the machine-readable code associated with the one or more critical dependencies according to one or more of a dependency type and a dependency severity.

20. A non-transitory computer-readable storage medium storing instructions that are configured to cause one or more processors to perform a method of:
- receiving, at a rules engine, machine-readable code describing interactions among a plurality of applications in a software architecture;
- evaluating, with the rules engine in communication with a system of record (SoR), compliance of the interactions among the plurality of applications according to the SoR;
- identifying, with the rules engine and based on the evaluating, one or more dependencies among the plurality of applications;
- generating, with an output engine, a system context diagram image comprising a graphical representation of the plurality of applications with associated interactions and dependencies; and
- outputting, for display, the system context diagram image.

* * * * *